US006657397B2

(12) United States Patent
Lee et al.

(10) Patent No.: US 6,657,397 B2
(45) Date of Patent: Dec. 2, 2003

(54) METHOD FOR RESETTING A PLASMA DISPLAY PANEL IN ADDRESS-WHILE-DISPLAY DRIVING MODE

(75) Inventors: Joo-Yul Lee, Asan (KR); Kyoung-Ho Kang, Asan (KR); Hee-Hwan Kim, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/225,119

(22) Filed: Aug. 22, 2002

(65) Prior Publication Data

US 2003/0057858 A1 Mar. 27, 2003

(30) Foreign Application Priority Data

Sep. 26, 2001 (KR) ........................................ 2001-59681

(51) Int. Cl.[7] .................................................. H01G 3/10

(52) U.S. Cl. ................................ 315/169.2; 315/169.4; 345/60

(58) Field of Search ........................... 315/169.4, 169.1, 315/169.3, 169.2; 345/36, 45, 37, 55, 60, 67, 76, 211; H01G 3/10; G09G 3/28

(56) References Cited

U.S. PATENT DOCUMENTS

| | | | | | |
|---|---|---|---|---|---|
| 5,446,344 | A | * | 8/1995 | Kanazawa | 315/169.4 |
| 6,034,482 | A | | 3/2000 | Kanazawa et al. | 315/169.4 |
| 6,317,105 | B1 | * | 11/2001 | Eo et al. | 345/68 |
| 6,456,264 | B1 | * | 9/2002 | Kang et al. | 345/63 |
| 6,483,487 | B2 | * | 11/2002 | Iseki | 345/60 |
| 2003/0098823 | A1 | * | 5/2003 | Lee et al. | 345/60 |

FOREIGN PATENT DOCUMENTS

| | | | | |
|---|---|---|---|---|
| EP | 071 068 | A1 | 1/2001 | G09G/3/28 |
| FR | 2 704 674 | A | 11/1994 | G09G/3/28 |

OTHER PUBLICATIONS

J. R. Beidl, et al., "Write and Erase Pulses With Opposite Polarities" IBM Technical Disclosure Bulleting, IBM Corp. New York, US, vol. 23, No. 12, May 1, 1981, pp. 5442–5443.

* cited by examiner

*Primary Examiner*—Don Wong
*Assistant Examiner*—Trinh Vo Dinh
(74) *Attorney, Agent, or Firm*—McGuireWoods LLP

(57) ABSTRACT

A resetting method includes a line discharge step, an erasure step, and an iteration step. The line discharge step is performed during a part of a first pulse width period. During the first pulse width period since a second subfield corresponding to a first XY-electrode line pair starts after a first subfield corresponding to the first XY-electrode line pair ends, a negative voltage of a first level is applied to all X-electrode lines, and simultaneously, a positive voltage of the first level is applied to all Y-electrode lines. In the line discharge step, a negative voltage of a second level higher than the first level is applied to an X-electrode line of the first XY-electrode line pair, and simultaneously, a positive voltage of a third level higher than the first level is applied to a Y-electrode line of the first XY-electrode line pair, thereby provoking discharges in all discharge cells corresponding to the first XY-electrode line pair. In the erasure step, wall charges are erased from all of the discharge cells corresponding to the first XY-electrode line pair. In the iteration step, the line discharge step and the erasure step are repeatedly performed on all XY-electrode line pairs other than the first XY-electrode line pair.

8 Claims, 13 Drawing Sheets

| | 70 | 80 | 90 | 100 |
|---|---|---|---|---|
| Vaymax | 120 | 120 | 120 | 120 |
| Vaxmax | 120 | 120 | 120 | 120 |
| Vaymin | 63 | 64 | 60 | 53 |
| Vaxmin | 63 | 64 | 60 | 53 |

| | 70 | 80 | 90 | 100 |
|---|---|---|---|---|
| Vaymax | 120 | 85 | 70 | 60 |
| Vaxmax | 120 | 90 | 75 | 65 |
| Vaymin | 120 | 120 | 120 | 120 |
| Vaxmin | 120 | 120 | 120 | 120 |

METHOD FOR RESETTING A PLASMA DISPLAY PANEL IN ADDRESS-WHILE-DISPLAY DRIVING MODE

BACKGROUND OF THE INVENTION

1. Field of the Invention

The present invention relates to a method for resetting a plasma display panel, and more particularly, to a method for resetting the state of discharge cells of each of XY-electrode line pairs while a surface discharge type triode plasma display panel is driven by an address-while-display driving method.

2. Description of the Related Art

FIG. 1 shows the structure of a surface discharge type triode plasma display panel. FIG. 2 shows an example of a discharge cell of the plasma display panel shown in FIG. 1. Referring to FIGS. 1 and 2, address electrode lines $A_1$, $A_2$, . . . , $A_{m-1}$, $A_m$, dielectric layers 11 and 15, Y-electrode lines $Y_1$, . . . , $Y_n$, X-electrode lines $X_1$, . . . , $X_n$, phosphor layers 16, partition walls 17, and a magnesium oxide (MgO) layer 12 as a protective layer are provided between front and rear glass substrates 10 and 13 of a general surface discharge plasma display panel 1.

The address electrode lines $A_1$ through $A_m$ are formed on the front surface of the rear glass substrate 13 in a predetermined pattern. A rear dielectric layer 15 is formed on the entire surface of the rear glass substrate 13 having the address electrode lines $A_1$ through $A_m$. The partition walls 17 are formed on the front surface of the rear dielectric layer 15 to be parallel to the address electrode lines $A_1$ through $A_m$. These partition walls 17 define the discharge areas of respective discharge cells and serve to prevent cross talk between discharge cells. The phosphor layers 16 are deposited between partition walls 17.

The X-electrode lines $X_1$ through $X_n$ and the Y-electrode lines $Y_1$ through $Y_n$ are formed on the rear surface of the front glass substrate 10 in a predetermined pattern to be orthogonal to the address electrode lines $A_1$ through $A_m$. The respective intersections define discharge cells. Each of the X-electrode lines $X_1$ through $X_n$ is composed of a transparent electrode line $X_{na}$ (FIG. 2) formed of a transparent conductive material, e.g., indium tin oxide (ITO), and a metal electrode line $X_{nb}$ (FIG. 2) for increasing conductivity. Each of the Y-electrode lines $Y_1$ through $Y_n$ is composed of a transparent electrode line $Y_{na}$ (FIG. 2) formed of a transparent conductive material, e.g., ITO, and a metal electrode line $Y_{nb}$ (FIG. 2) for increasing conductivity. A front dielectric layer 11 is deposited on the entire rear surface of the front glass substrate 10 having the rear surfaces of the X-electrode lines $X_1$ through $X_n$ and the Y-electrode lines $Y_1$ through $Y_n$. The protective layer 12, e.g., a MgO layer, for protecting the panel 1 against a strong electrical field is deposited on the entire surface of the front dielectric layer 11. A gas for forming plasma is hermetically sealed in a discharge space 14.

FIG. 3 shows a typical address-display separation driving method with respect to Y-electrode lines of the plasma display panel shown in FIG. 1. Referring to FIG. 3, to realize time-division gray scale display, a unit frame is divided into 8 subfields SF1 through SF8. In addition, the individual subfields SF1 through SF8 are composed of address periods A1 through A8, respectively, and display periods S1 through S8, respectively.

During each of the address periods A1 through A8, display data signals are applied to the address electrode lines $A_1$ through $A_m$ of FIG. 1, and simultaneously, a scan pulse is sequentially applied to the Y-electrode lines $Y_1$ through $Y_n$. If a high-level display data signal is applied to some of the address electrode lines $A_1$ through $A_m$ while the scan pulse is applied, wall charges are induced from address discharge only in relevant discharge cells.

During each of the display periods S1 through S8, a display discharge pulse is alternately applied to the Y-electrode lines $Y_1$ through $Y_n$ and the X-electrode lines $X_1$ through $X_n$, thereby provoking display discharge in discharge cells in which wall charges are induced during each of the address periods A1 through A8. Accordingly, the brightness of a plasma display panel is proportional to a total length of the display periods S1 through S8 in a unit frame. The total length of the display periods S1 through S8 in a unit frame is 255T (T is a unit time). Accordingly, including a case where the unit frame is not displayed, 256 gray scales can be displayed.

Here, the display period S1 of the first subfield SF1 is set to a time 1T corresponding to $2^0$. The display period S2 of the second subfield SF2 is set to a time 2T corresponding to $2^1$. The display period S3 of the third subfield SF3 is set to a time 4T corresponding to $2^2$. The display period S4 of the fourth subfield SF4 is set to a time 8T corresponding to $2^3$. The display period S5 of the fifth subfield SF5 is set to a time 16T corresponding to $2^4$. The display period S6 of the sixth subfield SF6 is set to a time 32T corresponding to $2^5$. The display period S7 of the seventh subfield SF7 is set to a time 64T corresponding to $2^6$. The display period S8 of the eighth subfield SF8 is set to a time 128T corresponding to $2^7$.

Accordingly, if a subfield to be displayed is appropriately selected from among 8 subfields, a total of 256 gray scales including a gray level of zero at which display is not performed in any subfield can be displayed.

According to the above-described address-display separation display method, the time domains of the respective subfields SF1 through SF8 are separated, so the time domains of respective address periods of the subfields SF1 through SF8 are separated, and the time domains of respective display periods of the subfields SF1 through SF8 are separated. Accordingly, during an address period, an XY-electrode line pair is kept waiting after being addressed until all of the other XY-electrode line pairs are addressed. Consequently, in each subfield, an address period increases, and a display period decreases. As a result, the brightness of light emitted from a plasma display panel decreases. A method proposed for overcoming this problem is an address-while-display driving method as shown in FIG. 4.

FIG. 4 shows a typical address-while-display driving method with respect to the Y-electrode lines of the plasma display panel shown in FIG. 1. Referring to FIG. 4, to realize time-division gray scale display, a unit frame is divided into 8 subfields $SF_1$ through $SF_8$. Here, the subfields $SF_1$ through $SF_8$ overlap with respect to the Y-electrode lines $Y_1$ through $Y_n$ and constitute a unit frame. Since all of the subfields $SF_1$ through $SF_8$ exist at any time point, address time slots are set among display discharge pulses in order to perform each address step.

In each of the subfields $SF_1$ through $SF_8$, a reset step, address step, and display discharge step are performed. A time allocated to each of the subfields $SF_1$ through $SF_8$ depends on a display discharge time corresponding to a gray scale. For example, when displaying 256 gray scales with 8-bit video data in units of frames, if a unit frame (usually, 1/60 second) is composed of 256 unit times, the first subfield $SF_1$ driven according to video data of the least significant bit has 1 ($2^0$) unit time, the second subfield $SF_2$ has 2 ($2^1$) unit times, the third subfield $SF_3$ has 4 ($2^2$) unit times, the fourth subfield $SF_4$ has 8 ($2^3$) unit times, the fifth subfield $SF_5$ has 16 ($2^4$) unit times, the sixth subfield $SF_6$ has 32 ($2^5$) unit times, the seventh subfield $SF_7$ has 64 ($2^6$) unit times, and the eighth subfield $SF_8$ driven according to video data of the most significant bit has 128 ($2^7$) unit times. Since the sum of unit times allocated to the subfields $SF_1$ through $SF_8$ is 255, 255 gray scale display can be accomplished. If a gray scale having no display discharge in any subfield is included, 256 gray scale display can be accomplished.

FIG. 5 shows a typical driving apparatus for the plasma display panel shown in FIG. 1. Referring to FIG. 5, the typical driving apparatus for the plasma display panel 1 includes a video processor 66, a logic controller 62, an address driver 63, an X-driver 64, and a Y-driver 65. The video processor 66 converts an external analog video signal into a digital signal to generate an internal video signal composed of, for example, 8-bit red (R) video data, 8-bit green (G) video data, 8-bit blue (B) video data, a clock signal, a horizontal synchronizing signal, and a vertical synchronizing signal. The logic controller 62 generates drive control signals $S_A$, $S_Y$, and $S_X$ in response to the internal video signal from the video processor 66. The address driver 63 processes the address signal $S_A$ among the drive control signals $S_A$, $S_Y$, and $S_X$ output from the logic controller 62 to generate a display data signal and applies the display data signal to address electrode lines. The X-driver processes the X-drive control signal $S_X$ among the drive control signals $S_A$, $S_Y$, and $S_X$ output from the logic controller 62 and applies the result of processing to X-electrode lines. The Y-driver processes the Y-drive control signal $S_Y$ among the drive control signals $S_A$, $S_Y$, and $S_X$ output from the logic controller 62 and applies the result of processing to Y-electrode lines.

When an address-while-display driving method as shown in FIG. 4 is applied to the above-described driving of a plasma display panel, the brightness of light emitted from the plasma display panel can be increased, but it is not easy to perform reset while display pulses are periodically applied, which causes resetting performance to fall off.

For example, in a resetting process according to a conventional address-while-display driving method, a simple erasure discharge in which wall charges are erased from only cells in which display discharges have occurred in a previous subfield occurs. Accordingly, while space charges increase in the cells in which display discharges have occurred in a previous subfield, space charge decrease in cells in which display discharges have not occurred in the previous subfield. In this case, while the cells in which display discharges have occurred in a previous subfield can be selected by a relatively lower address voltage, the cells in which display discharges have not occurred can be selected by a relatively higher address voltage. Accordingly, address voltage and display voltage must be increased, which may badly affect the reliability and life of a plasma display apparatus. Moreover, display brightness is not uniform among the cells in which display discharges have occurred in a previous subfield and the cells in which display discharges have not occurred in the previous subfield, thereby degrading the display performance.

SUMMARY OF THE INVENTION

To solve the above-described problems, it is an object of the present invention to provide a resetting method capable of demonstrating high performance in driving a surface discharge type triode plasma display panel using an address-while-display driving method so that display performance can be increased and that address voltage and display voltage can be decreased, thereby improving the reliability and life of a plasma display apparatus.

To achieve the above object of the present invention, there is provided a resetting method for uniforming the state of discharge cells of each of XY-electrode line pairs while a positive voltage of a first level and a negative voltage of the first level are alternately applied to all X- and Y-electrode lines of a surface discharge type triode plasma display panel. The resetting method includes a line discharge step, an erasure step, and an iteration step.

The line discharge step is performed during a part of a first pulse width period during which the negative voltage of the first level is applied to all of the X-electrode lines, and simultaneously, the positive voltage of the first level is applied to all of the Y-electrode lines, since a second subfield corresponding to the first XY-electrode line pair starts after a first subfield corresponding to the first XY-electrode line pair ends. In the line discharge step, a negative voltage of a second level higher than the first level is applied to an X-electrode line of the first XY-electrode line pair, and simultaneously, a positive voltage of a third level higher than the first level is applied to a Y-electrode line of the first XY-electrode line pair, thereby provoking discharges in all discharge cells corresponding to the first XY-electrode line pair. In the erasure step, wall charges are erased from all of the discharge cells corresponding to the first XY-electrode line pair. In the iteration step, the line discharge step and the erasure step are repeated on the remaining XY-electrode line pairs.

According to the resetting method of the present invention, in the line discharge step, due to application of the negative voltage of the second level higher than the first level and the positive voltage of the third level higher than the first level, discharges are provoked in all of the discharge cells corresponding to the first XY-electrode line pair so that wall charges and space charges are satisfactorily formed. In the next erasure step, the wall charges are uniformly erased from all of the discharge cells corresponding to the first XY-electrode line pair, but the space charges still satisfactorily remain. Moreover, since the iteration step is performed, the line discharge step and the erasure step can be performed on each of the remaining XY-electrode line pairs while the positive voltage of the first level and the negative voltage of the first level are alternately applied to all of the X- and Y-electrode lines. As described above, since effective resetting adequate for an address-while-display driving method is performed, display performance increases. In addition, an address voltage and a display voltage are set to be low, thereby improving the reliability and the life of a plasma display apparatus.

BRIEF DESCRIPTION OF THE DRAWINGS

The above object and advantages of the present invention will become more apparent by describing in detail preferred embodiments thereof with reference to the attached drawings.

DETAILED DESCRIPTION OF THE INVENTION

Figure 5:
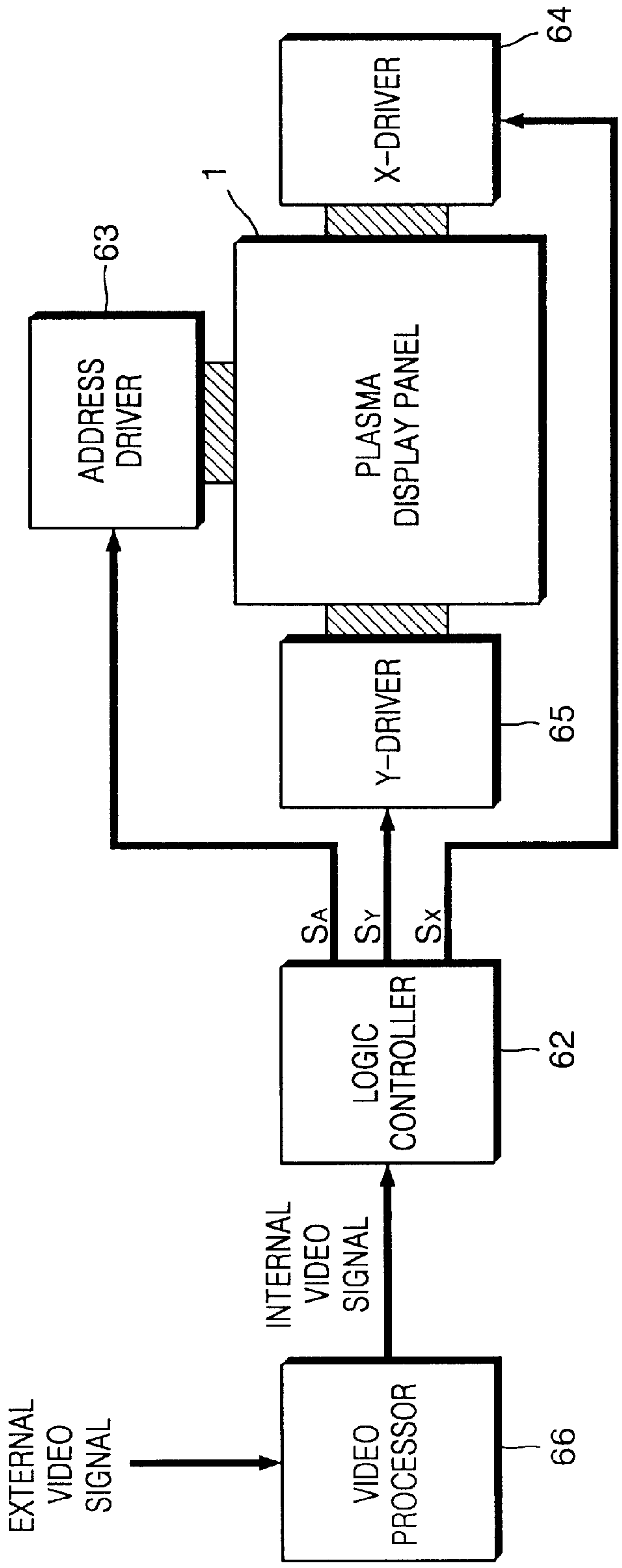
FIG. 5 (PRIOR ART)
FIG. 5 is a block diagram of a typical driving apparatus for the plasma display panel shown in FIG. 1.
Figure 6:
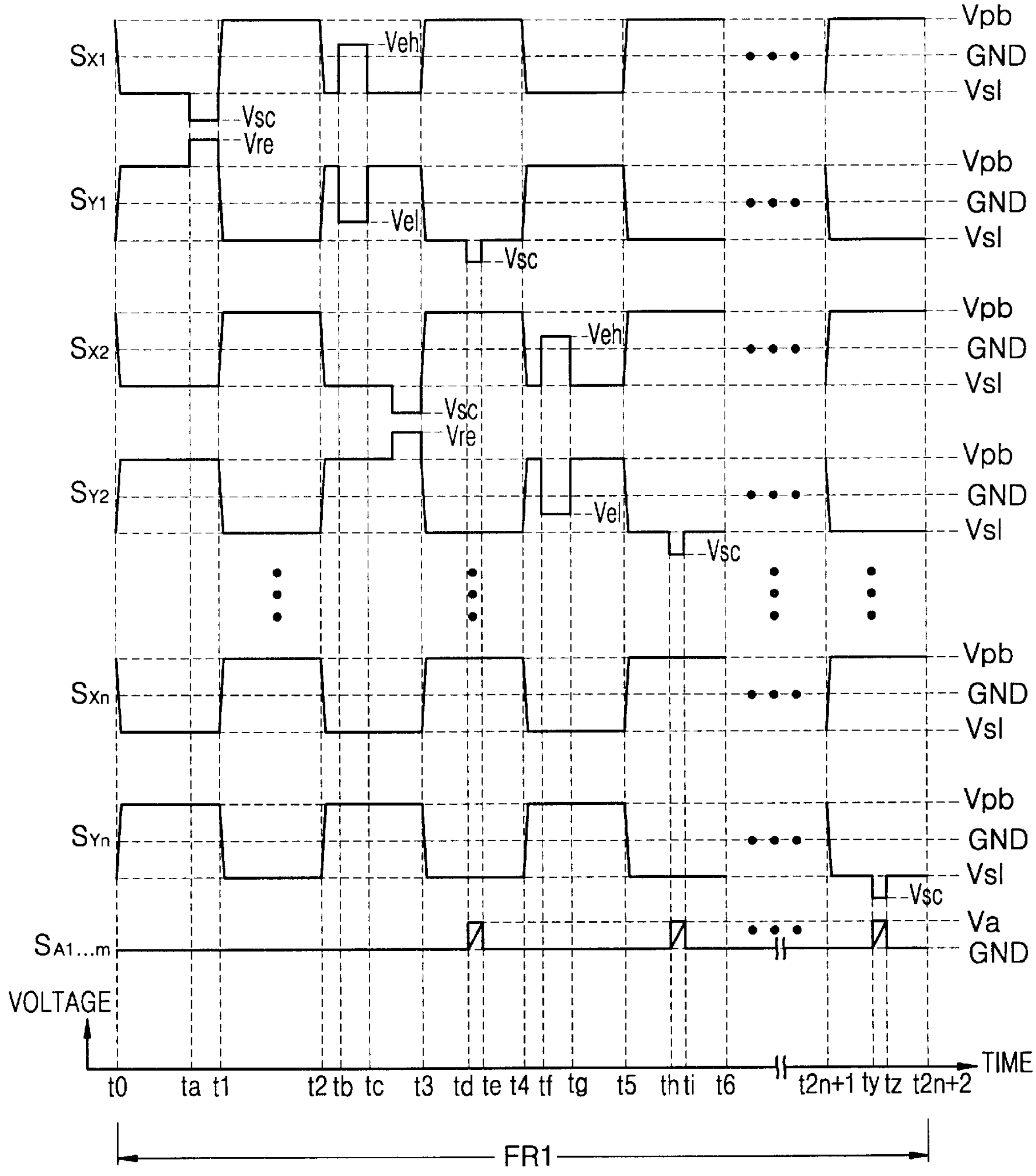
FIG. 6 is a timing chart of a resetting method used for an address-while-display driving method according to a first embodiment of the present invention.

FIG. 6 shows a resetting method used for an address-while-display driving method according to a first embodiment of the present invention. In FIG. 6, a reference character $S_{X1}$ denotes a driving signal applied to an X-electrode line of an XY-electrode line pair performing initial resetting and addressing in a unit frame FR1, and a reference character $S_{Y1}$ denotes a driving signal applied to the Y-electrode line of the XY-electrode line pair performing the initial resetting and addressing in the unit frame FR1. A reference character $S_{X2}$ denotes a driving signal applied to an X-electrode line of an XY-electrode line pair performing second resetting and addressing in the unit frame FR1, and a reference character $S_{Y2}$ denotes a driving signal applied to the Y-electrode line of the XY-electrode line pair performing the second resetting and addressing in the unit frame FR1. A reference character $S_{Xn}$ denotes a driving signal applied to an X-electrode line of an XY-electrode line pair performing last resetting and addressing in the unit frame FR1, and a reference character $S_{Yn}$ denotes a driving signal applied to the Y-electrode line of the XY-electrode line pair performing the last resetting and addressing in the unit frame FR1. A reference character $S_{A1 \ldots m}$ denotes a display data signal applied from the address driver 63 of FIG. 5 to all address electrode lines.

Figure 7:
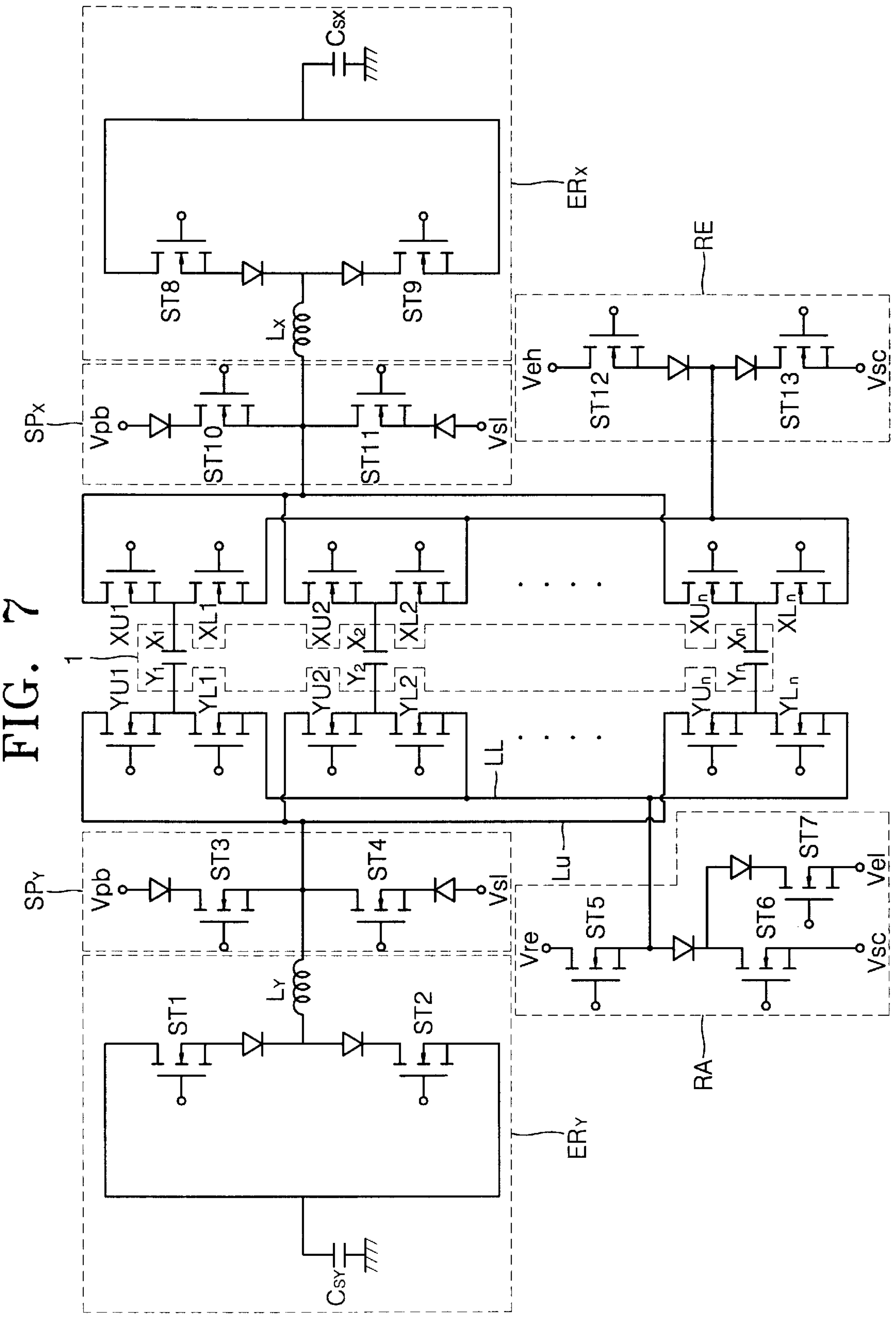
FIG. 7 is a circuit diagram of X- and Y-drivers which can perform the resetting method of FIG. 6.

FIG. 7 shows X- and Y-drivers which can perform the resetting method of FIG. 6. In FIG. 7, a circuit on the left of the plasma display panel 1 corresponds to the Y-driver 65 of FIG. 5, and a circuit on the right of the plasma display panel 1 corresponds to the X-driver 64 of FIG. 5.

Referring to FIG. 7, the Y-driver (65 of FIG. 5) includes upper transistors YU1 through $YU_n$, lower transistors YL1 through $YL_n$, a Y-energy regeneration circuit $ER_Y$, a Y-display discharge circuit $SP_Y$, and a Y-resetting/addressing circuit RA. The upper transistors YU1 through $YU_n$ and the lower transistors YL1 through $YL_n$ are connected to Y-electrode lines $Y_1$ through $Y_n$. The Y-energy regeneration circuit $ER_Y$ collects charges around the Y-electrode lines $Y_1$ through $Y_n$ during the falling time of display discharge pulses simultaneously applied from the Y-display discharge circuit $SP_Y$ to the Y-electrode lines $Y_1$ through $Y_n$ and applies the collected charges to the Y-electrode lines $Y_1$ through $Y_n$ during the rising time of the display discharge pulses. The Y-display discharge circuit $SP_Y$ alternately applies a positive voltage Vpb of a first level and a negative voltage Vsl of the first level to the Y-electrode lines $Y_1$ through $Y_n$. The Y-energy regeneration circuit $ER_Y$ and the Y-display discharge circuit $SP_Y$ are commonly applied to all of the Y-electrode lines $Y_1$ through $Y_n$ through the upper transistors YU1 through $YU_n$. The Y-resetting/addressing circuit RA outputs voltages Vre and Vel for resetting according to the present invention and a voltage Vsc for addressing during resetting time and addressing time for each Y-electrode line. Accordingly, the Y-resetting/addressing circuit RA is independently applied to each of the Y-electrode lines $Y_1$ through $Y_n$ through each of the lower transistors YL1 through $YL_n$.

Similarly, the X-driver (64 of FIG. 5) includes upper transistors XU1 through $XU_n$, lower transistors XL1 through $XL_n$, an X-energy regeneration circuit $ER_X$, an X-display discharge circuit $SP_X$, and an X-resetting circuit RE. The upper transistors XU1 through $XU_n$ and the lower transistors XL1 through $XL_n$ are connected to X-electrode lines $X_1$ through $X_n$. The X-energy regeneration circuit $ER_X$ collects charges around the X-electrode lines $X_1$ through $X_n$ during the falling time of display discharge pulses simultaneously applied from the X-display discharge circuit $SP_X$ to the X-electrode lines $X_1$ through $X_n$ and applies the collected charges to the X-electrode lines $X_1$ through $X_n$ during the rising time of the display discharge pulses. The X-display discharge circuit $SP_X$ alternately applies a positive voltage Vpb of a first level and a negative voltage Vsl of the first level to the X-electrode lines $X_1$ through $X_n$. The X-energy regeneration circuit $ER_X$ and the X-display discharge circuit $SP_X$ are commonly applied to all of the X-electrode lines $X_1$ through $X_n$ through the upper transistors XU1 through $XU_n$. The X-resetting circuit RE outputs voltages Veh and Vsc for resetting according to the present invention during resetting time for each X-electrode line. Accordingly, the X-resetting circuit RE is independently applied to each of the X-electrode lines $X_1$ through $X_n$ through each of the lower transistors XL1 through $XL_n$.

A resetting method according to the present invention used for an address-while-display driving method will be described in detail with reference to FIGS. 6 and 7.

As shown in FIG. 6, in an address-while-display driving method for a plasma display panel, resetting and addressing are performed on the XY-electrode line pairs $X_1Y_1$, $X_2Y_2$, . . . , $X_nY_n$ while the positive and negative voltages Vpb and Vsl of the first level are alternately applied to all of the X- and Y-electrode lines $X_1$ through $X_n$ and $Y_1$ through $Y_n$.

A resetting method according to the present invention includes a line discharge step ta–t1, an erasure step tb–tc, and iteration steps. Since a second subfield corresponding to a first XY-electrode line pair starts after a first subfield corresponding to the first XY-electrode line pair performing initial resetting and addressing in a unit frame FR1, during a first pulse width period t0–t1, a negative voltage Vsl of a first level is applied to all of the X-electrode lines $X_1$ through $X_n$, and simultaneously, a positive voltage Vpb of the first level is applied to all of the Y-electrode lines $Y_1$ through $Y_n$. In the line discharge step ta–t1 during the first pulse width period t0–t1, the upper transistors (for example, XU1 and YU1) of the first XY-electrode line pair (for example, $X_1Y_1$) are turned off, the lower transistors (for example, XL1 and YL1) thereof are turned on, a transistor ST13 of the X-resetting circuit RE is turned on, and a transistor ST5 of the Y-resetting/addressing circuit RA is turned on. As a result, a negative voltage Vsc of a second level higher than the first level is applied to the X-electrode line $X_1$ of the first XY-electrode line pair $X_1Y_1$, and simultaneously, a positive voltage Vre of a third level higher than the first level is applied to the Y-electrode line $Y_1$ of the first XY-electrode line pair $X_1Y_1$. Accordingly, discharges are provoked in all discharge cells corresponding to the first XY-electrode line pair $X_1Y_1$, thereby uniformly forming wall charges and satisfactorily forming space charges.

During a second pulse width period t1–t2 immediately after the first pulse width period t0–t1 during which the line discharge step ta–t1 is performed, the upper transistors XU1 and YU1 of the first XY-electrode line pair $X_1Y_1$ are turned on, the lower transistors XL1 and YL1 thereof are turned off, a transistor ST10 of the X-display discharge circuit $SP_X$ is turned on, and a transistor ST4 of the Y-display discharge circuit $SP_Y$ is turned on. As a result, the positive voltage Vpb of the first level is applied to all of the X-electrode lines $X_1$ through $X_n$, and simultaneously, the negative voltage Vsl of the first level is applied to all of the Y-electrode lines $Y_1$ through $Y_n$, so that wall charges are uniformly formed and space charges are satisfactorily formed in all of the discharge cells corresponding to the first XY-electrode line pair $X_1Y_1$.

In an erasure step performed for a predetermined time tb–tc during a third pulse width period t2–t3 immediately after the second pulse width period t1–t2, the upper transistors XU1 and YU1 of the first XY-electrode line pair $X_1Y_1$ are turned off, the lower transistors XL1 and YL1 thereof are turned on, a transistor ST12 of the X-resetting circuit RE is turned on, and a transistor ST7 of the Y-resetting/addressing circuit RA is turned on. As a result, a positive voltage Veh of a fourth level lower than the first level is applied to the X-electrode line X1 of the first XY-electrode line pair $X_1Y_1$, and simultaneously, a negative voltage Vel of a fifth level lower than the first level is applied to the Y-electrode line $Y_1$ of the first XY-electrode line pair $X_1Y_1$. Accordingly, wall charges are erased from all of the discharge cells corresponding to the first XY-electrode line pair $X_1Y_1$. However, the space charges satisfactorily remain in the discharge cells.

Such line discharge step and erasure step are sequentially performed on each of the remaining XY-electrode line pairs (see driving signals $S_{X2}$ and $S_{Y2}$ of FIG. 6).

According to a resetting method of the present invention as described referring to FIGS. 6 and 7, in the line discharge step ta–t1, discharges are provoked in all discharge cells corresponding to the first XY-electrode line pair $X_1Y_1$ so that wall charges are uniformly formed and space charges are satisfactorily formed. In addition, since the second pulse width period t1–t2 is immediately followed by the third pulse width period t2–t3, secondary discharges are provoked in all of the discharge cells corresponding to the first XY-electrode line pair $X_1Y_1$ so that wall charges are more uniformly formed and space charges are more satisfactorily formed. In the next erasure step, the wall charges are uniformly erased from all of the discharge cells corresponding to the first XY-electrode line pair $X_1Y_1$, but the space charges still satisfactorily remain. Moreover, since the iteration step is performed, the line discharge step and the erasure step can be performed on each of the remaining XY-electrode line pairs while the positive voltage Vpb of the first level and the negative voltage Vsl of the first level are alternately applied to all of the X- and Y-electrode lines $X_1$ through $X_n$ and $Y_1$ through $Y_n$. As described above, effective and adequate resetting for an address-while-display driving method increases display performance. In addition, an address voltage and a display voltage are set to be low, thereby improving the reliability and the life of a plasma display apparatus.

In FIG. 6, durations td–te, th–ti, and ty–tz are for addressing during which wall charges are formed in selected discharge cells, after resetting according to the present invention.

Figure 8:
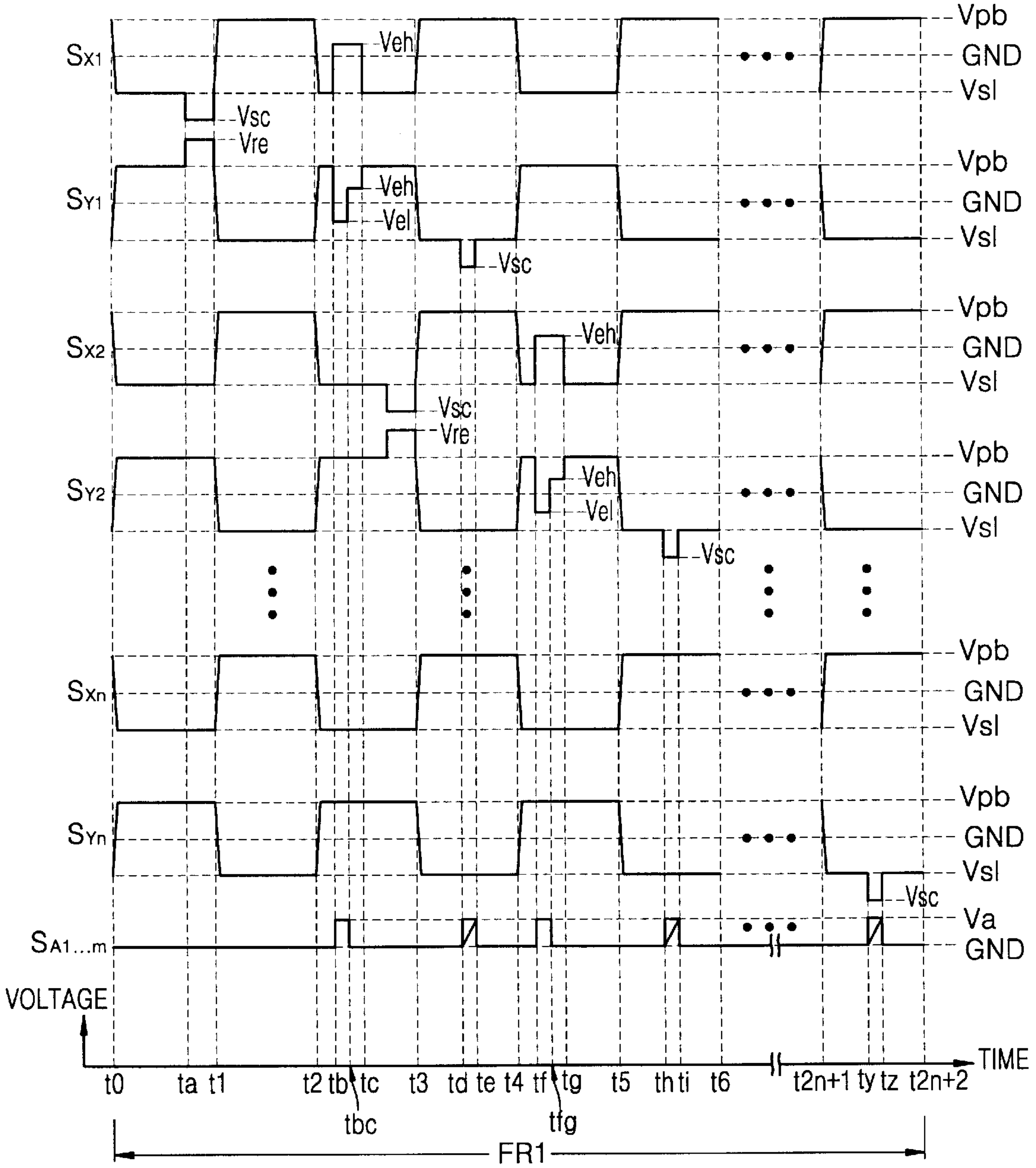
FIG. 8 is a timing chart of a resetting method used for an address-while-display driving method according to a second embodiment of the present invention.
Figure 9:
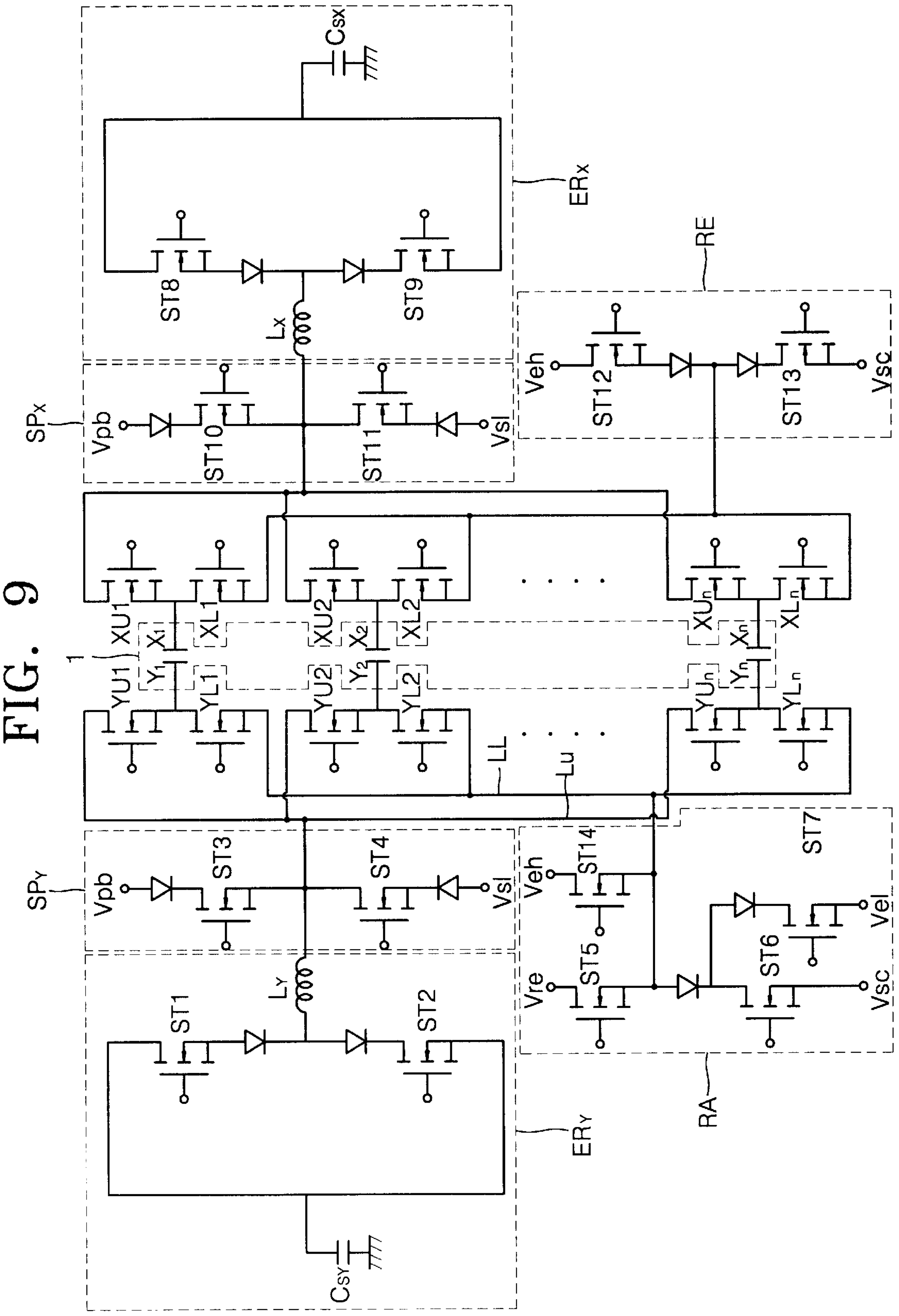
FIG. 9 is a circuit diagram of X- and Y-drivers which can perform the resetting method of FIG. 8.

FIG. 8 shows a resetting method used for an address-while-display driving method according to a second embodiment of the present invention. FIG. 9 shows X- and Y-drivers (64 and 65 of FIG. 5) which can perform the resetting method of FIG. 8. In FIGS. 6 through 9, the same, reference characters denote the same members having the same functions. The second embodiment shown in FIGS. 8 and 9 is almost the same as the first embodiment shown in FIGS. 6 and 7 but has a difference in an erasure step. Thus, a description of the second embodiment shown in FIGS. 8 and 9 will be concentrated on an erasure step.

Figure 1:
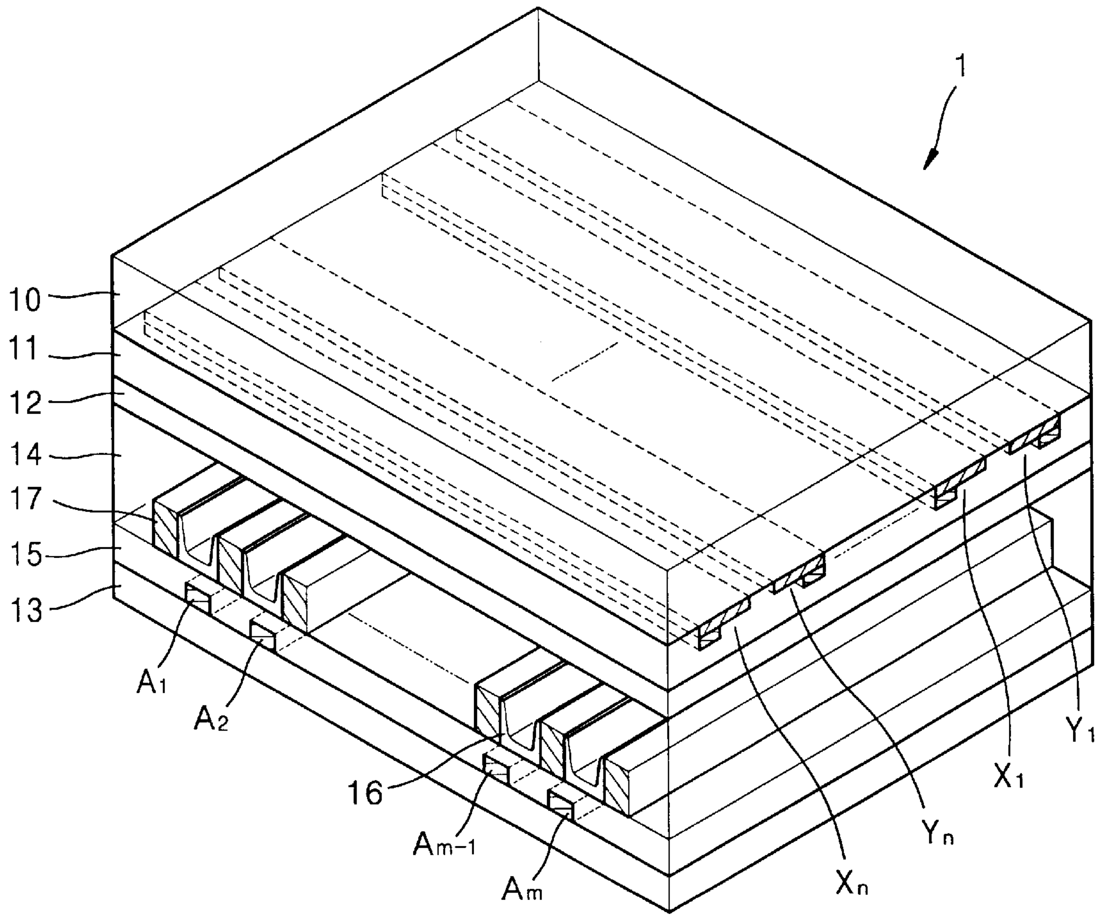
FIG. 1 (PRIOR ART)
FIG. 1 is a perspective view of the internal structure of a typical surface discharge type triode plasma display panel.
Figure 2:
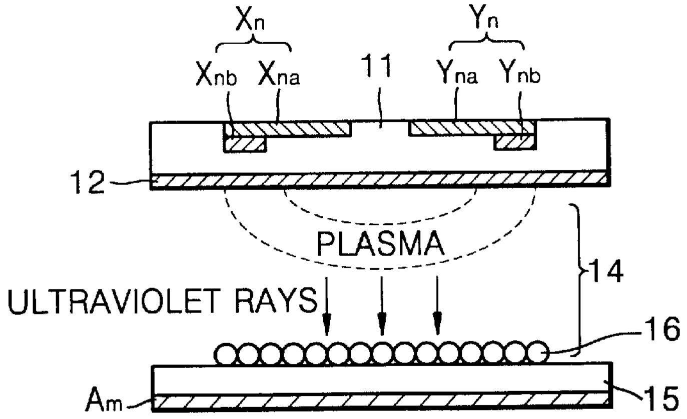
FIG. 2 (PRIOR ART)
FIG. 2 is a sectional view of an example of a discharge cell in the plasma display panel shown in FIG. 1.
Figure 3:
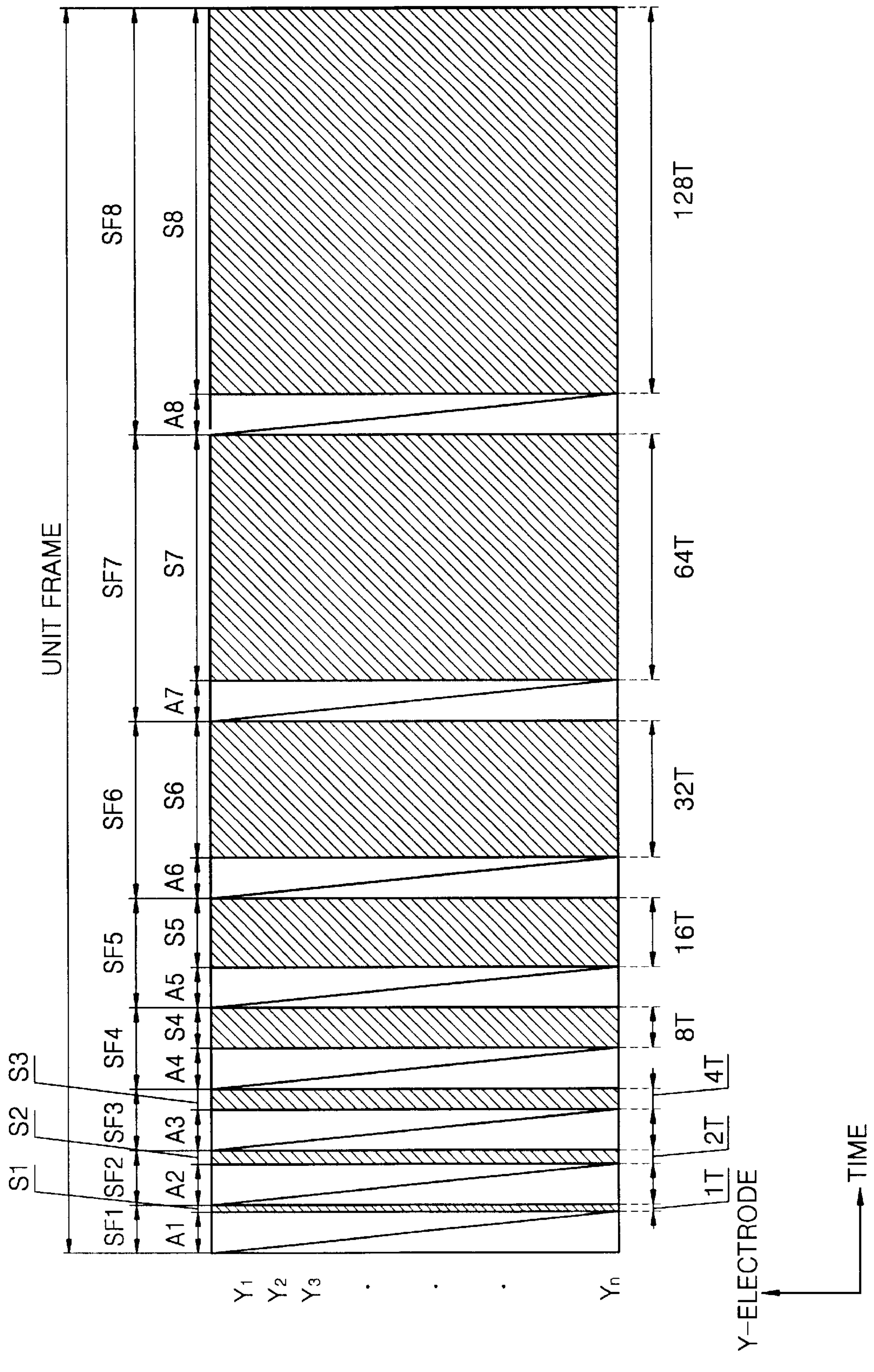
FIG. 3 (PRIOR ART)
FIG. 3 is a timing chart of a typical address-display separation driving method with respect to Y-electrode lines of the plasma display panel shown in FIG. 1.
Figure 4:
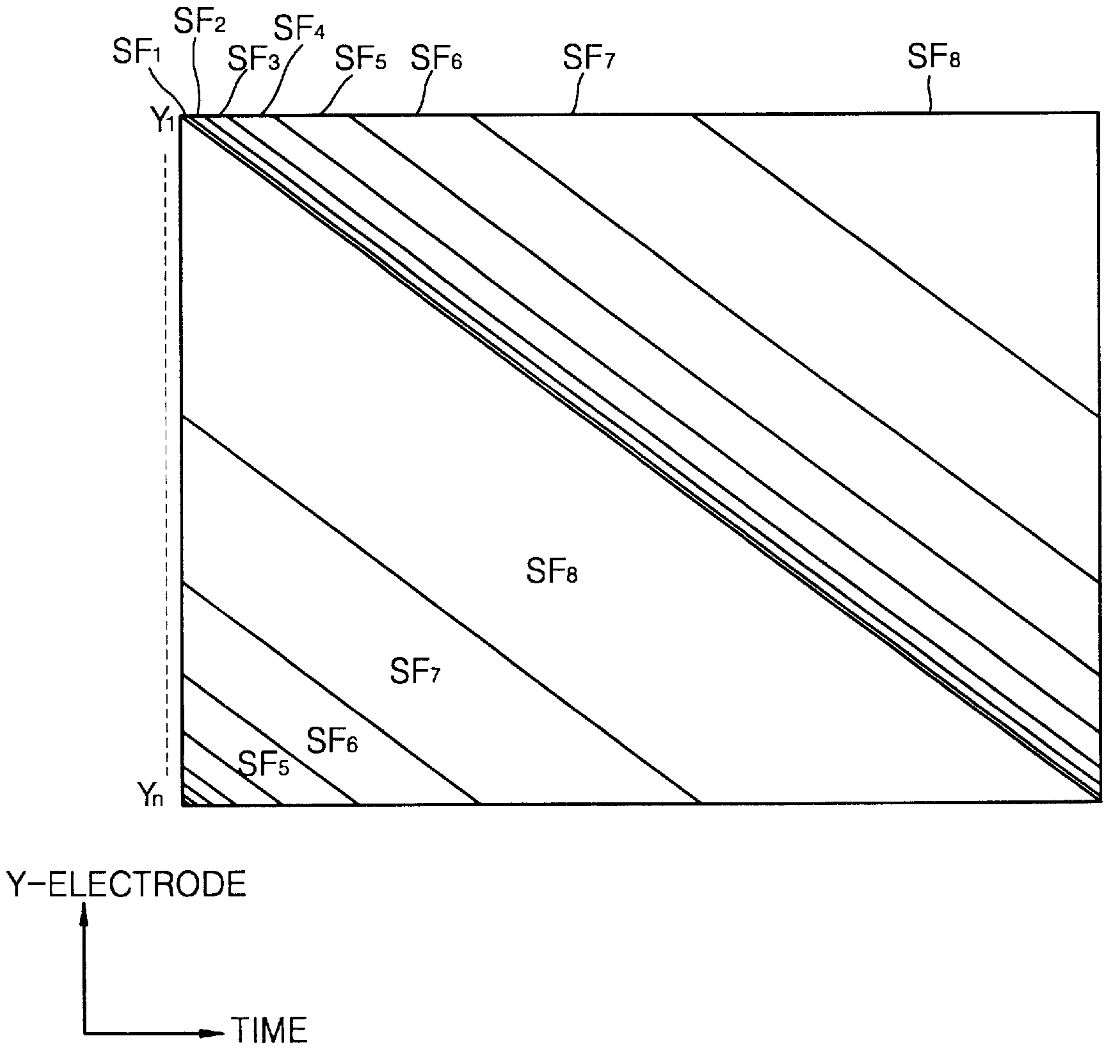
FIG. 4 (PRIOR ART)
FIG. 4 is a timing chart of a typical address-while-display driving method with respect to Y-electrode lines of the plasma display panel shown in FIG. 1.

During the first half tb–tbc of an erasure time tb–tc, the upper transistors (for example, XU1 and YU1) of a first XY-electrode line pair (for example, $X_1Y_1$) are turned off, the lower transistors (for example, XL1 and YL1) thereof are turned on, a transistor ST12 of an X-resetting circuit RE is turned on, a transistor ST7 of a Y-resetting/addressing circuit RA is turned on, and a positive voltage Va of a sixth level lower than the first level is applied to all of the address electrode lines $A_1$ through $A_m$ of FIG. 1. In other words, during the first half tb–tbc of an erasure time tb–tc, the negative voltage Vel of the fifth level lower than the first level is applied to the Y-electrode line $Y_1$ of the first XY-electrode line pair $X_1Y_1$, and simultaneously, the positive voltage Va of the sixth level lower than the first level is applied to all of the address electrode lines $A_1$ through $A_m$. As a result, opposite discharges occur among the Y-electrode line $Y_1$ of the first XY-electrode line pair $X_1Y_1$ and all of the address electrode lines $A_1$ through $A_m$, thereby erasing wall charges which have been formed in all discharge cell corresponding to the first XY-electrode line pair $X_1Y_1$. Such erasure operation is repeated in each (for example, an erasure time tf–tg) of the following erasure times.

Figure 10:
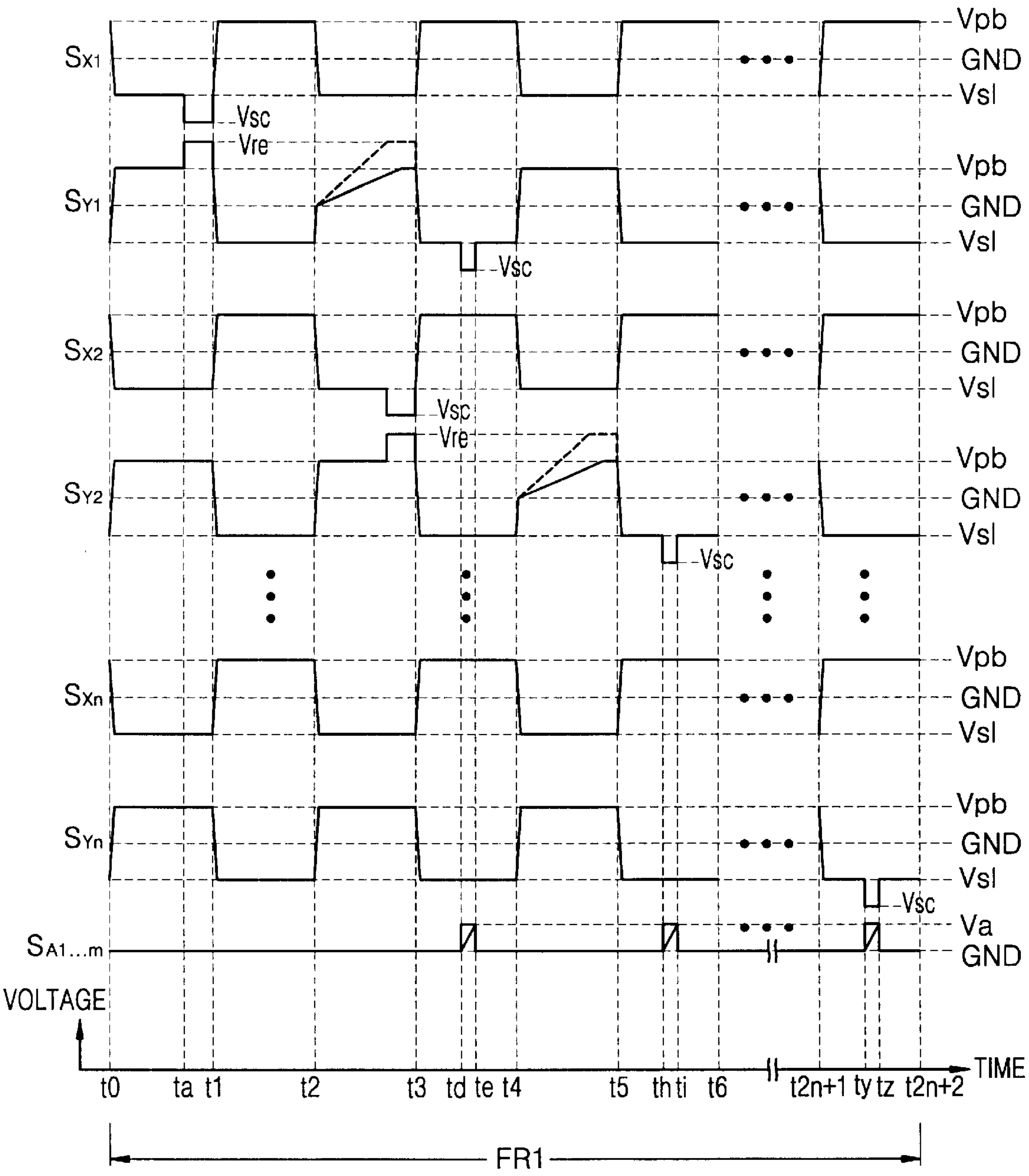
FIG. 10 is a timing chart of a resetting method used for an address-while-display driving method according to a third embodiment of the present invention.
Figure 11:
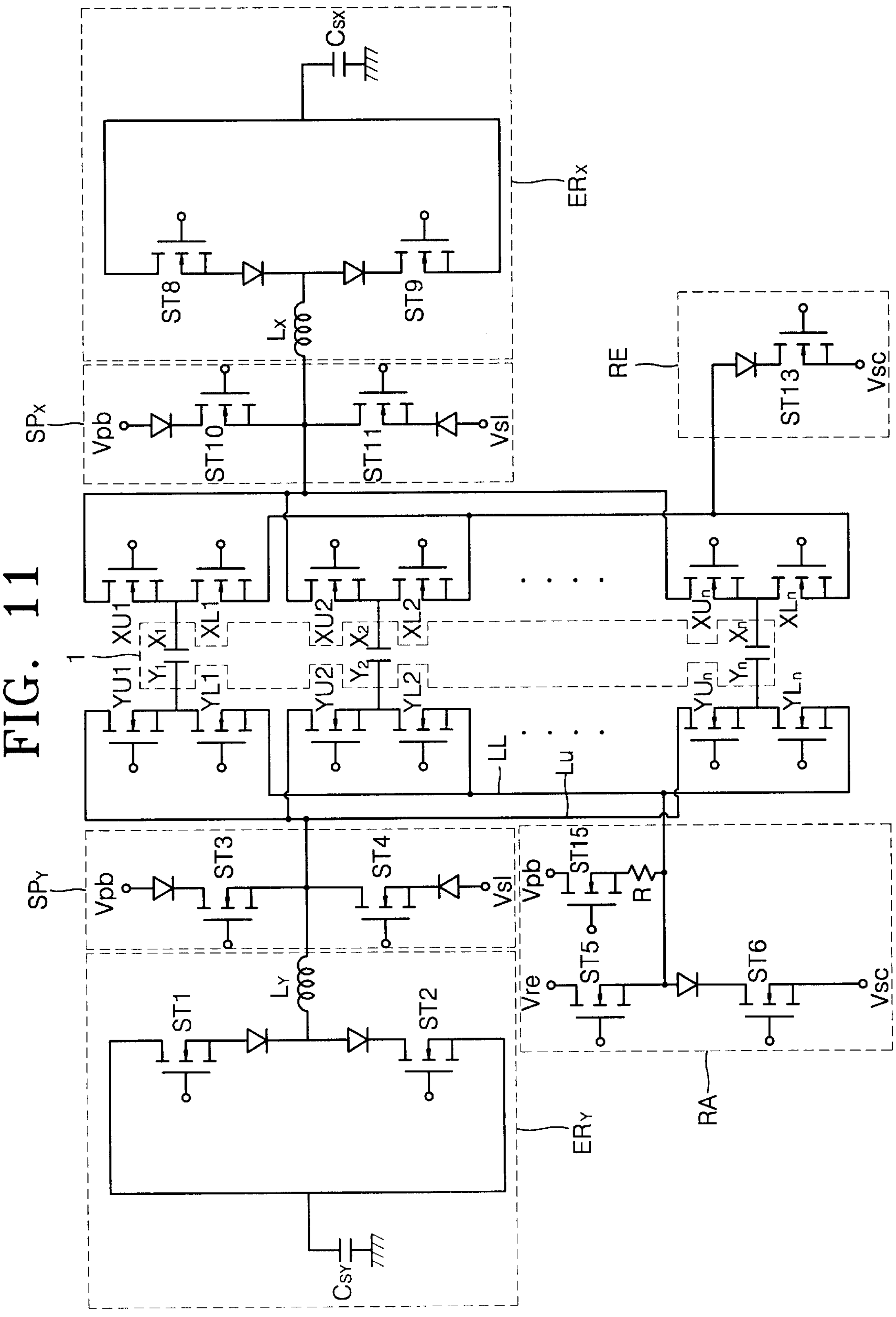
FIG. 11 is a circuit diagram of X- and Y-drivers which can perform the resetting method of FIG. 10.

FIG. 10 shows a resetting method used for an address-while-display driving method according to a third embodiment of the present invention. FIG. 11 shows X- and Y-drivers (64 and 65 of FIG. 5) which can perform the resetting method of FIG. 10. In FIGS. 6, 7, 10, and 11, the same reference characters denote the same members having the same functions. The third embodiment shown in FIGS. 10 and 11 is almost the same as the first embodiment shown in FIGS. 6 and 7 but has a difference in an erasure step. Thus, a description of the third embodiment shown in FIGS. 10 and 11 will be concentrated on an erasure step.

In the third embodiment, erasing is performed throughout a unit pulse width period t2–t3. During the time t2–t3, the upper transistor YU1 of the Y-electrode line $Y_1$ of a first XY-electrode line pair (for example, $X_1Y_1$) is turned off, the lower transistor YL1 of the Y-electrode line $Y_1$ is turned on, and a transistor ST15 of a Y-resetting/addressing circuit RA is turned on. As a result, according to the resistance value of a resistance device R connected to the source of the transistor ST15, a voltage applied to the Y-electrode line $Y_1$ of the first XY-electrode line pair $X_1Y_1$ gradually increases from the negative voltage Vsl of the first level or a ground voltage GND to the positive voltage Vpb of the first level. Consequently, wall charges which have been formed in all discharge cells corresponding to the first XY-electrode line pair $X_1Y_1$ are erased. Here, if the positive voltage Vre of the third level higher than the first level is applied to the drain of the transistor ST15 of the Y-resetting/addressing circuit RA, a voltage applied to the Y-electrode line $Y_1$ of the first XY-electrode line pair $X_1Y_1$ gradually increases from the negative voltage Vsl of the first level or the ground voltage GND to the positive voltage Vre of the third level according to the resistance value of the resistance device R connected to the source of the transistor ST15, thereby erasing wall charges which have been formed in all discharge cells corresponding to the first XY-electrode line pair $X_1Y_1$.

Figure 12:
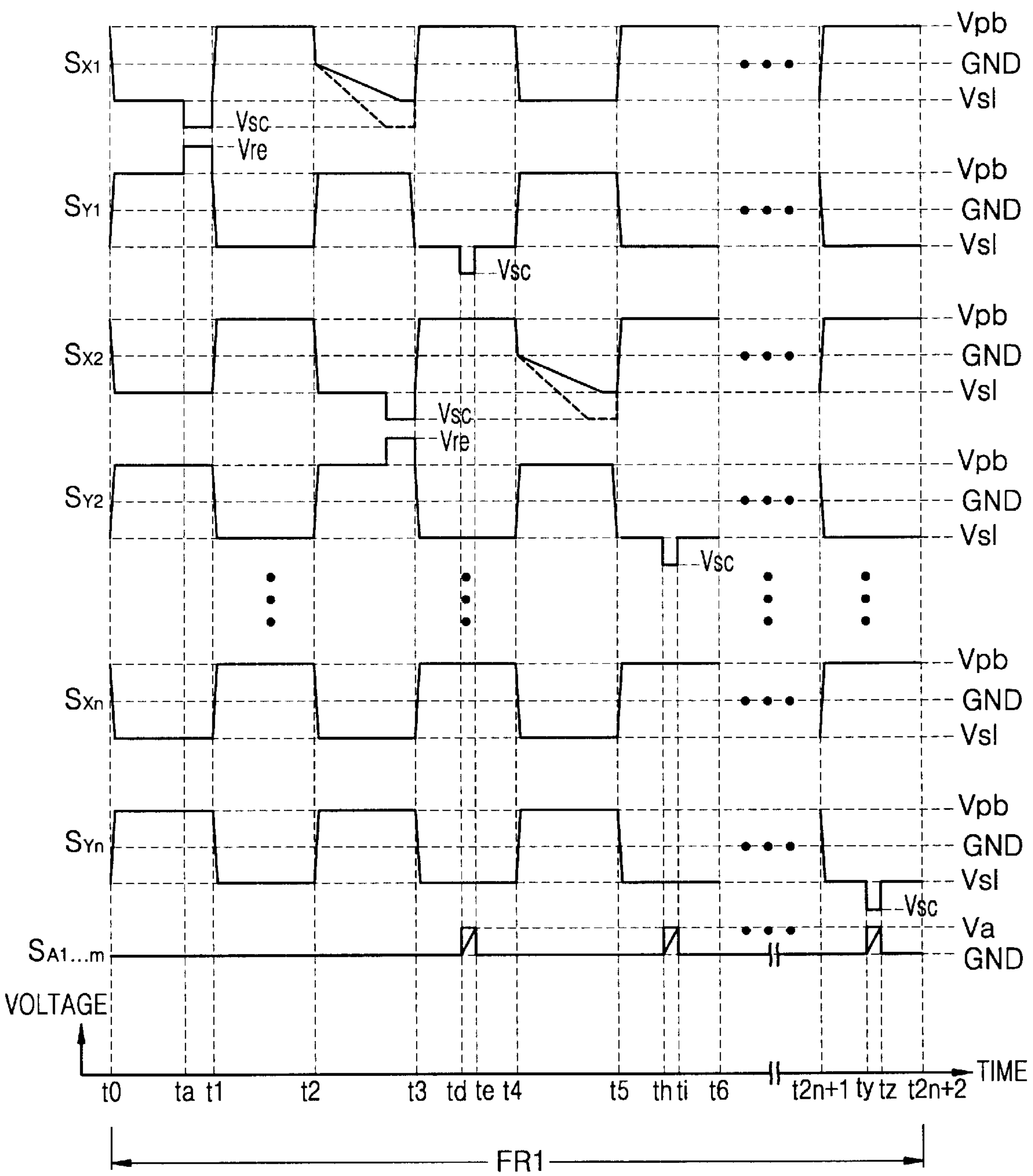
FIG. 12 is a timing chart of a resetting method used for an address-while-display driving method according to a fourth embodiment of the present invention.
Figure 13:
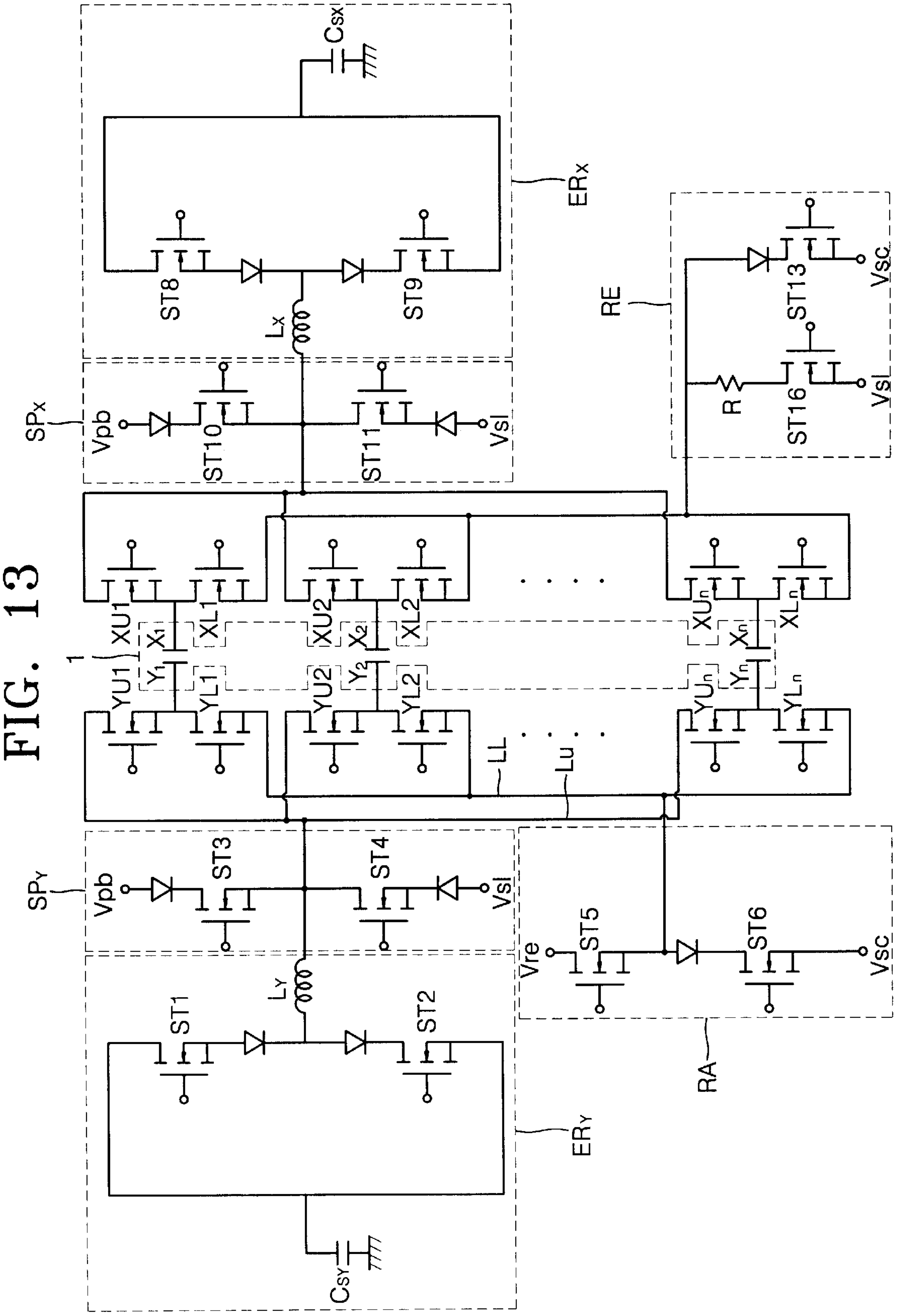
FIG. 13 is a circuit diagram of X- and Y-drivers which can perform the resetting method of FIG. 12.

FIG. 12 shows a resetting method used for an address-while-display driving method according to a fourth embodiment of the present invention. FIG. 13 shows X- and Y-drivers (64 and 65 of FIG. 5) which can perform the resetting method of FIG. 12. In FIGS. 6, 7, 12, and 13, the same reference characters denote the same members having the same functions. The fourth embodiment shown in FIGS. 12 and 13 is almost the same as the first embodiment shown in FIGS. 6 and 7 but has a difference in an erasure step. Thus, a description of the fourth embodiment shown in FIGS. 12 and 13 will be concentrated on an erasure step.

In the fourth embodiment, erasing is performed throughout a unit pulse width period t2–t3. During the time t2–t3, the upper transistor XU1 of the X-electrode line $X_1$ of a first XY-electrode line pair (for example, $X_1Y_1$) is turned off, the lower transistor XL1 of the X-electrode line $X_1$ is turned on, and a transistor ST16 of an X-resetting circuit RE is turned on. As a result, according to the resistance value of a resistance device R connected to the drain of the transistor ST16, a voltage applied to the X-electrode line $X_1$ of the first XY-electrode line pair $X_1Y_1$ gradually decreases from the positive voltage Vpb of the first level or a ground voltage GND to the negative voltage Vsl of the first level. Consequently, wall charges which have been formed in all discharge cells corresponding to the first XY-electrode line pair $X_1Y_1$ are erased. Here, if the negative voltage Vsc of the second level higher than the first level is applied to the source of the transistor ST16 of the X-resetting circuit RE, a voltage applied to the X-electrode line $X_1$ of the first XY-electrode line pair $X_1Y_1$ gradually decreases from the positive voltage Vpb of the first level or the ground voltage GND to the negative voltage Vsc of the second level according to the resistance value of the resistance device R connected to the drain of the transistor ST16, thereby erasing wall charges which have been formed in all discharge cells corresponding to the first XY-electrode line pair $X_1Y_1$.

Figure 14:
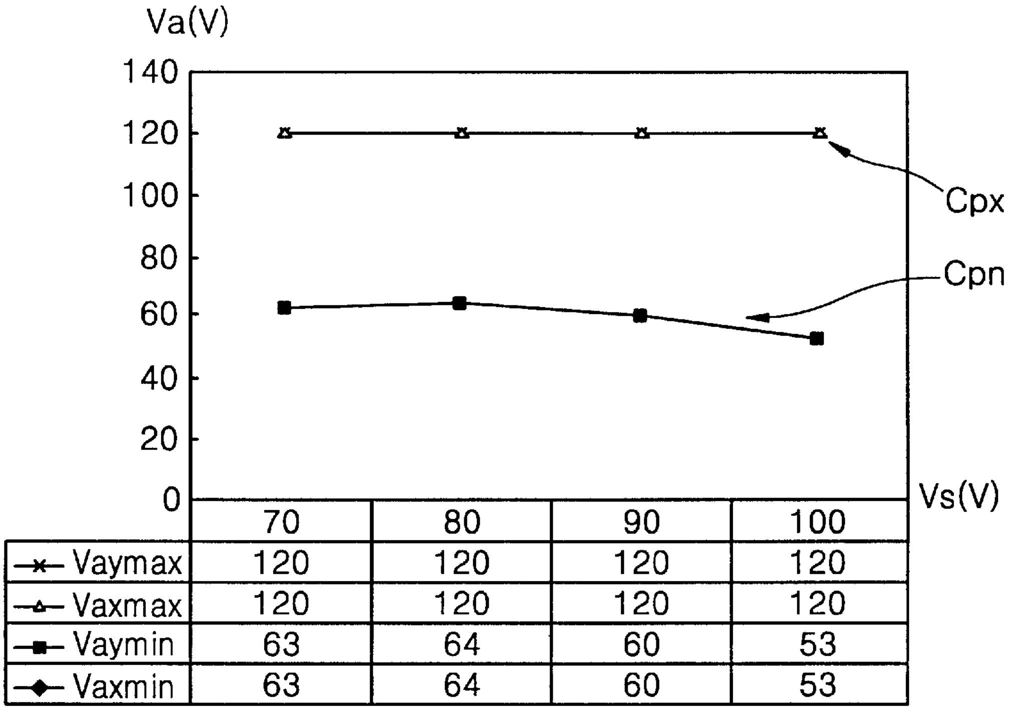
FIG. 14 is a graph of display voltages applied to a discharge cell versus address voltages applied thereto when a resetting method according to the present invention is used.
Figure 15:
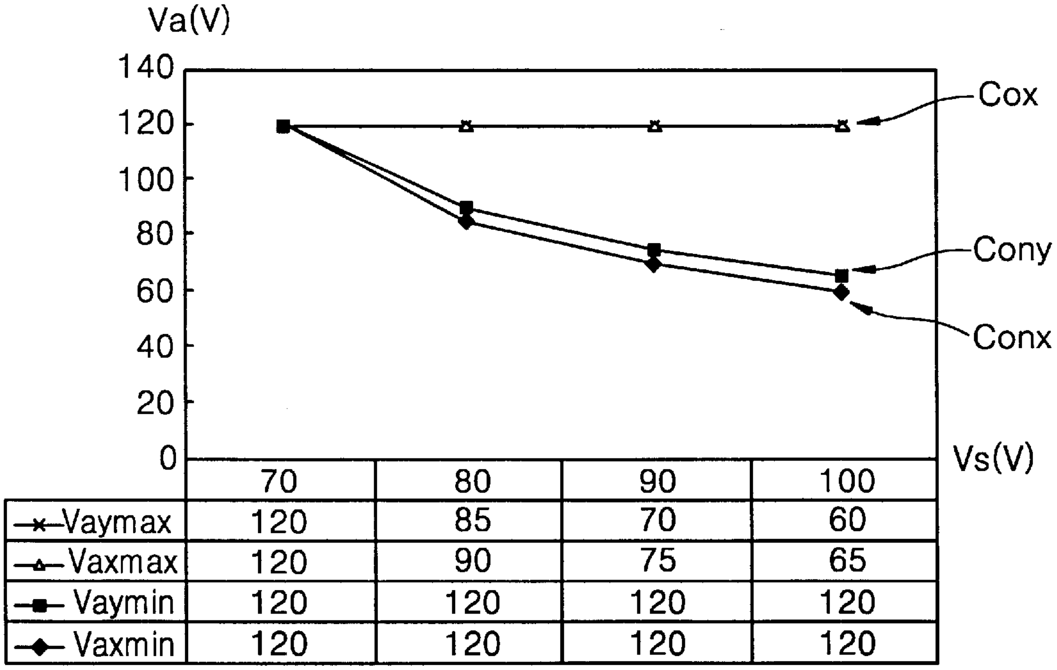
FIG. 15 (PRIOR ART)
FIG. 15 is a graph of display voltages applied to a discharge cell versus address voltages applied thereto when a conventional simple resetting method is used.

FIG. 14 shows display voltages applied to a discharge cell versus address voltages applied thereto when a resetting method according to the present invention is used. FIG. 15 shows display voltages applied to a discharge cell versus address voltages applied thereto when a conventional simple resetting method is used. In FIGS. 14 and 15, a reference character Va denotes an address voltage applied between the address electrode of one discharge cell and the Y-electrode of the discharge cell or an address voltage applied between the address electrode of one discharge cell and the X-electrode of the discharge cell. Vs denotes a display voltage applied between the X-electrode and the Y-electrode of the discharge cell. Vaymax denotes a maximum address voltage with respect to each display voltage Vs when a Y-electrode is used as a scan electrode. Vaxmax denotes a maximum address voltage with respect to each display voltage Vs when an X-electrode is used as a scan electrode. Vaymin denotes a minimum address voltage with respect to each display voltage Vs when a Y-electrode is used as a scan electrode. Vaxmin denotes a minimum address voltage with respect to each display voltage Vs when an X-electrode is used as a scan electrode. Cpx denotes a graph of an overlap characteristic between the maximum address voltages Vaymax and Vaxmax according to the present invention. Cpn denotes a graph of an overlap characteristic between the minimum address voltages Vaymin and Vaxmin according to the present invention. Cox denotes a graph of an overlap characteristic between the maximum address voltages Vaymax and Vaxmax according to conventional technology. Cony denotes a characteristic graph of a minimum address voltage Vaymin according to conventional technology, when a Y-electrode is used as a scan electrode. Conx denotes a characteristic graph of a minimum address voltage Vaxmin according to conventional technology when an X-electrode is used as a scan electrode. Referring to FIGS. 14 and 15, the minimum address voltages Vaymin and Vaxmin according to the present invention are lower than those according to the conventional technology, so the margin of the address voltage Va increases. Particularly, in the present invention, even if the display voltage Vs decreases, the minimum address voltages Vaymin and Vaxmin do not increase. Here, the margin of the address voltage Va indicates a difference between a maximum address voltage and a minimum address voltage.

As described above, according to a resetting method of the present invention, discharges are provoked in all discharge cells corresponding to a first XY-electrode line pair in a line discharge step so that wall charges and space charges can satisfactorily formed. Accordingly, if an erasure step is performed, wall charges are uniformly erased from the all of the discharge cells corresponding to the first XY-electrode line pair, and space charges satisfactorily remain in the discharge cells. In addition, an iteration step enables the line discharge step and the erasure step on each of the XY-electrode line pairs while a positive voltage and a negative voltage are alternately applied to all X- and Y-electrode lines. Such effective resetting adequate for an address-while-display driving method enhances display performance. Moreover, a low address voltage and a low display voltage improve the reliability and the life of plasma display panel device.

The present invention is not restricted to the above-described embodiments. It will be understood by those skilled in the art that various changes in form and details may be made therein without departing from the spirit and scope of the invention as defined by the appended claims.

What is claimed is:

1. A method for resetting to normalize discharge cells of each of XY-electrode line pairs while applying a positive voltage of a first magnitude and a negative voltage of the first magnitude alternately to all X-electrode lines and all Y-electrode lines in a surface discharge type plasma display panel, comprising steps of:

(a) applying simultaneously a negative voltage of a second magnitude to an X-electrode line of a first XY-electrode line pair and a positive voltage of a third magnitude to a Y-electrode line of the first XY-electrode line pair, so as to provoke discharges in all discharge cells corresponding to the first XY-electrode line pair during pulse period;

(b) after a first subfield corresponding to the first XY-electrode line pair ends, simultaneously applying the positive voltage of the first magnitude to all of the Y-electrode lines;

(c) erasing wall charges from all of the discharge cells corresponding to the first XY-electrode line pair, and (d) repeating steps (a), (b) and (c) on rest of XY-electrode line pairs, wherein both the second magnitude and the third magnitude are greater than the first magnitude.

2. The method of claim 1, wherein in a second pulse period following the first pulse period, the positive voltage of the first magnitude and the negative voltage of the first magnitude are simultaneously applied respectively to the X-electrode line of the first XY-electrode line pair and to the Y-electrode line of the XY-electrode line pair, in a third pulse period following the second pulse period, the negative voltage of the first magnitude and the positive voltage of the first magnitude are simultaneously applied respectively to the X-electrode line on the first XY-electrode line pair and to the Y-electrode line of the first XY-electrode line pair, to cause secondary discharges in all of the discharge cells corresponding to the first XY-electrode line pair, and step (c) is performed during the third pulse period.

3. The method of claim 2, wherein erasing is performed during only a part of the third pulse period.

4. The method of claim 3, wherein in step (c), a positive voltage of a fourth magnitude and a negative voltage of a fifth magnitude are simultaneously applied respectively to the X-electrode line of the first XY-electrode line pair and to the Y-electrode line of the first electrode line pair, thereby erasing the wall charges from all the discharge cells corresponding to the first XY-electrode line pair, wherein both the fourth magnitude and the fifth magnitude are lower than the first magnitude.

5. The method of claim 3, where in step (c), a negative voltage of a fifth magnitude and a positive voltage of a sixth magnitude are simultaneously applied respectively to the Y-electrode line of the first XY-electrode line pair and to all address electrode lines, thereby erasing the wall charges from all the discharge cells corresponding to the first XY-electrode line pair, wherein both the fifth magnitude and the sixth magnitude are lower than the first magnitude.

6. The method of claim 2, wherein step (c) is performed throughout the third pulse width period.

7. The method of claim 6, where in step (c), a voltage applied to the Y-electrode line of the first XY-electrode line pair gradually increases from one of the negative voltage of the first magnitude and a ground voltage to one of the positive voltage of the first magnitude and the positive voltage of the third magnitude.

8. The method of claim 6, wherein in step (c), a voltage applied to the X-electrode line of the first XY-electrode line pair gradually decreases from one of the positive voltage of the first magnitude and a ground voltage to one of the negative voltage of the first magnitude and the negative voltage of the second magnitude.

* * * * *